United States Patent [19]

Burns et al.

[11] 3,833,303

[45] Sept. 3, 1974

[54] MEASURING APPARATUS USING THE MOIRE FRINGE CONCEPT OF MEASUREMENT

[75] Inventors: Richard H. Burns, Webster; Donald R. Hosack; Helmut Welker, both of Jamestown, all of N.Y.

[73] Assignee: Bausch & Lomb Incorporated, Rochester, N.Y.

[22] Filed: Oct. 6, 1972

[21] Appl. No.: 295,777

[52] U.S. Cl............... 356/169, 250/237 G, 356/172
[51] Int. Cl. ........................................... G01b 11/04
[58] Field of Search ............. 74/440; 356/169, 172; 33/125 A, 125 C, 125 R, 174 L; 287/87; 267/158; 250/237 G

[56] References Cited
UNITED STATES PATENTS

| | | | |
|---|---|---|---|
| 1,849,305 | 3/1932 | Magarian............................ 350/321 |
| 2,235,976 | 3/1941 | Best....................................... 287/87 |
| 2,694,804 | 11/1954 | Wagner............................... 356/169 |
| 2,704,890 | 3/1955 | Welsch................................ 33/125 R |
| 2,797,488 | 7/1957 | Willrich et al...................... 33/125 R |
| 2,886,717 | 5/1959 | Williamson et al................ 356/170 |
| 3,142,718 | 7/1964 | Rantsch et al..................... 33/125 A |
| 3,153,111 | 10/1964 | Barber et al...................... 250/237 G |
| 3,274,885 | 9/1966 | Rocher et al........................ 350/86 |
| 3,328,109 | 6/1967 | Seedhouse........................... 350/86 |
| 3,403,448 | 10/1968 | Aller................................... 33/174 L |
| 3,586,665 | 6/1971 | Weyrauch........................... 356/169 |
| 3,588,462 | 6/1971 | Kreckel.............................. 356/169 |
| 3,602,205 | 8/1971 | Turkish.............................. 267/158 |

FOREIGN PATENTS OR APPLICATIONS 427,614 4/1935 Great Britain...................... 350/86

*Primary Examiner*—John K. Corbin
*Assistant Examiner*—Paul K. Godwin
*Attorney, Agent, or Firm*—Frank C. Parker; Bernard D. Bogdon; DeWitt M. Morgan

[57] ABSTRACT

Measuring apparatus using the moire fringe concept of measurement to provide a precise digital numeric indication of displacement between two relatively movable members. The apparatus includes an accurately ruled grating or scale, a transducer head in the form of an index grating supported on a movable carriage and a transducer support housing. The scale is secured in a spar which is preferably mounted to the carriage of a machine tool such as a milling machine. The transducer support housing is mounted to the stationery part or bed of the machine tool and is provided with a cantilever spring element which holds the carriage in direct contact with the scale.

13 Claims, 6 Drawing Figures

MEASURING APPARATUS USING THE MOIRE FRINGE CONCEPT OF MEASUREMENT

BACKGROUND OF THE INVENTION

1. Field of the Invention

This invention relates to incremental photo-electric measuring apparatus using the moire fringe concept of measurement. This principle is used in such devices as optical comparators, height gages and measuring machines. It also finds application in machine tools.

2. Description of the Prior Art

The main element of a moire fringe type measurement system is an accurately ruled grating or scale of the desired length of travel. This scale is commonly of glass or steel and has a precisely known number of lines per unit length (for example, 500 equal lines and spaces per inch). When a second scale with the same line structure is superimposed on the scale at a slight angle such that the two line structures cross a pattern of dark and light bands is produced as the lines on the second scale fall on lines or spaces of the first scale. This integrated image is what is known as a moire fringe pattern. The spacing of the moire fringes can be adjusted by rotating one scale relative to the other about an axis which is perpendicular to both scales. When the second scale, commonly known as the index grating, is translated along the scale normal to the direction of the lines on the scale the fringe pattern travels at right angles to the direction of movement. By passing a light beam through both the scale and the index grating the movement of the fringe pattern may be converted into electrical signals by the use of photo-electric sensors. The output from such photo-electric sensors can be, for example, summed, shaped and amplified and then fed to an electronic digital display counter. The signals from the photo-electric sensors may also be used to give an indication of the direction of motion.

As a general proposition, systems incorporating the moire fringe concept of measurement are not subject to wear errors or the degree of backlash inherent in translating the motion of, for instance, a rack and pinion to a direct measurement. Thus, they can be used on machine tools whenever a linear or angular change in position must be accurately determined. Such use eliminates the need for highly accurate lead screws, racks and pinions or other similar devices.

Measuring apparatus based on the moire fringe concept comprises three basic parts: (1) an accurately ruled scale; (2) a reading or transducer head which is movable relative to the scale; and (3) an electronic display unit for translating the electronic signals received from the transducer head into a legible numeric display. In many systems the transducer head includes an index grating, a light source and photo-electric sensors.

In order for the transducer head to pick up an optical image off the scale the spacing and alignment between the scale and the index grating has to stay very constant. In the past, this has required a lengthy and critical mounting procedure whereby the scale had to be lined up parallel to the direction of, for example, machine table travel and then the transducer head had to be separately mounted at a specified distance from and rotational alignment to the scale. Typically, the parallelism between the longitudinal axes of the transducer head and the scale had to be maintained within a few thousandths of an inch along the entire length of travel. If the system had to be dismounted for servicing such lengthy alignment procedure had to be repeated upon reinstallation.

As an alternative to the above described separate parallel mounting of the scale and the transducer head both the scale and the transducer head may be mounted to the same spar. In this type of system the scale is fixed to the spar and the transducer head (containing the grating scale) mounted on a slide. The slide may take the form of a pair of machined surfaces on the spar. However, in order to insure that the spacing between the scale and the spar remains constant over the entire length of travel the slide must be carefully machined and the scale carefully mounted parallel to it.

In the past, two methods were used to mount the spar which supports the scale to the machine or fixture on which the scale was to be used. One method consisted of mounting the spar at each end only. However, for spar lengths of 4 feet or longer, vibrations could easily be set up which could jeopardize the correct functioning of the system. Therefore, on longer lengths cumbersome support brackets were required to keep the vibrations to a minimum and also to prevent excessive deflection. Another method of mounting the scale supporting spar consisted of providing mounting holes at certain increments over the length of the spar. These mountings holes increased the height of the spar which, on certain machines, made mounting very difficult.

This invention overcomes the above described alignment problems by sliding the transducer head directly on the scale. Constant spacing and alignment between the two gratings is thereby assured. This invention also overcomes prior art mounting problems by providing the spar with a longitudinally extending female dovetail which is received on a male dovetail fastened to the mounting surface.

BRIEF SUMMARY OF THE INVENTION

A moire fringe type measuring apparatus for determining displacement between two relatively movable members. The apparatus includes: (1) an accurately ruled scale secured to one of the two movable members; (2) a transducer head including a carriage and an index grating with the same line structure as the scale; (3) a transducer support housing secured to the other of the two movable members; and (4) a cantilever spring member secured at one of its ends to the transducer support housing and carrying a ball on its other end which is received in a socket provided in the carriage to form a ball-and-socket type connection. The scale is secured in its mounting spar at an angle with respect to the vertical and the carriage is provided with a pair relatively angled scale engaging surfaces. This arrangement enables the upward force exerted by the cantilever spring to hold the scale engaging surfaces of the carriage in direct contact with the scale at all locations along the scale. Since the index grating is fixed parallel to one of the two scale engaging surfaces of the carriage the constant spacing and alignment between the scale and the index grating necessary to produce the moire fringe, without the tedious and time comsuming alignment procedures required by prior art devices, is assured. The foregoing arrangement together with dovetail mounting means reduces the overall size of the apparatus.

In view of the foregoing, it is an object of this invention to provide the necessary parallelism between the scale and the index grating without the tedious alignment procedure heretofore used and to reduce the overall size of the measuring apparatus.

Further objects and advantages of the present invention should become apparent from an examination of the drawings and accompanying description.

BRIEF DESCRIPTION OF THE DRAWINGS

FIG. 3 is another sectional view of the apparatus taken along line 3—3 of FIG. 1;

DESCRIPTION OF THE PREFERRED EMBODIMENT

Figure 1:
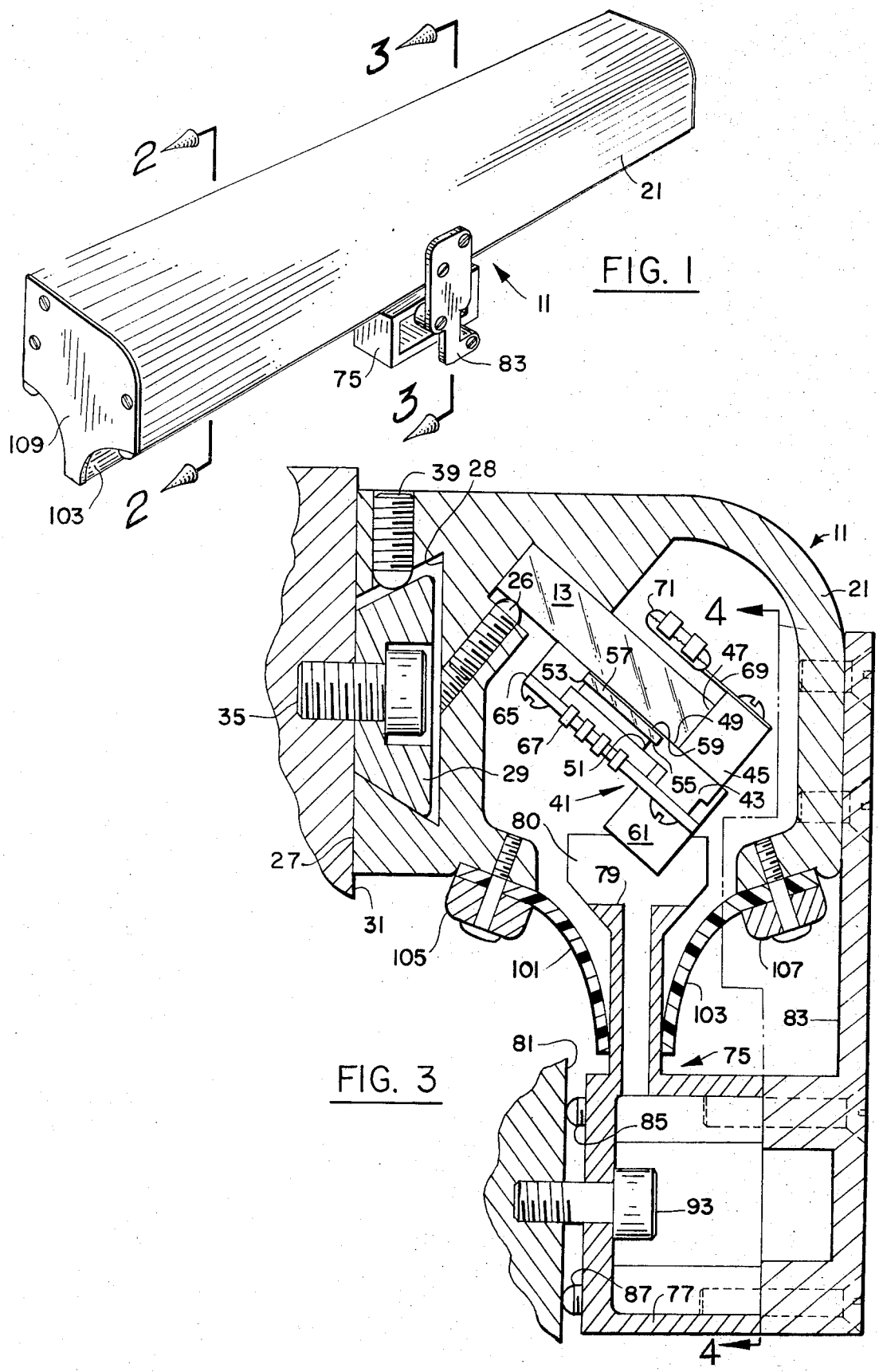
FIG. 1 is a perspective view of a preferred embodiment of the apparatus.

One of the basic components of apparatus 11 is an accurately ruled scale 13. In the preferred embodiment scale 13 is made of silvering quality plate glass having edges which are, for example, straight to within ±0.003 inches over the entire length. As is evident from inspection of, particularly, FIG. 2 scale 13 includes a bottom surface 15 and a bottom edge 17. Bottom surface 15 is provided with a line frequency of, for example, 500 equal lines and spaces per inch. These lines run perpendicular to the major axis of the scale. The bottom edge 17 is ground and polished over the entire length. Edge 17 is, preferably, perpendicular to surface 15.

Scale 13 is housed in spar 21 which has an inverted U-shape cross-section. The interior of spar 21 is provided with a longitudinally extending slot 23 which is inclined between 35° and 55° with respect to the vertical. Scale 13 is held in slot 23 either by a plurality of fasteners, such as set screws 25, 26, or by an epoxy cement.

Spar 21 is also provided with a longitudinally extending mounting surface 27 and a female dovetail 28 which extends parallel to slot 23. Mounting surface 27 and dovetail 28 may be either on the side, as illustrated in FIGS. 2 and 3, or may be located on the top surface of spar 21.

Figure 2:
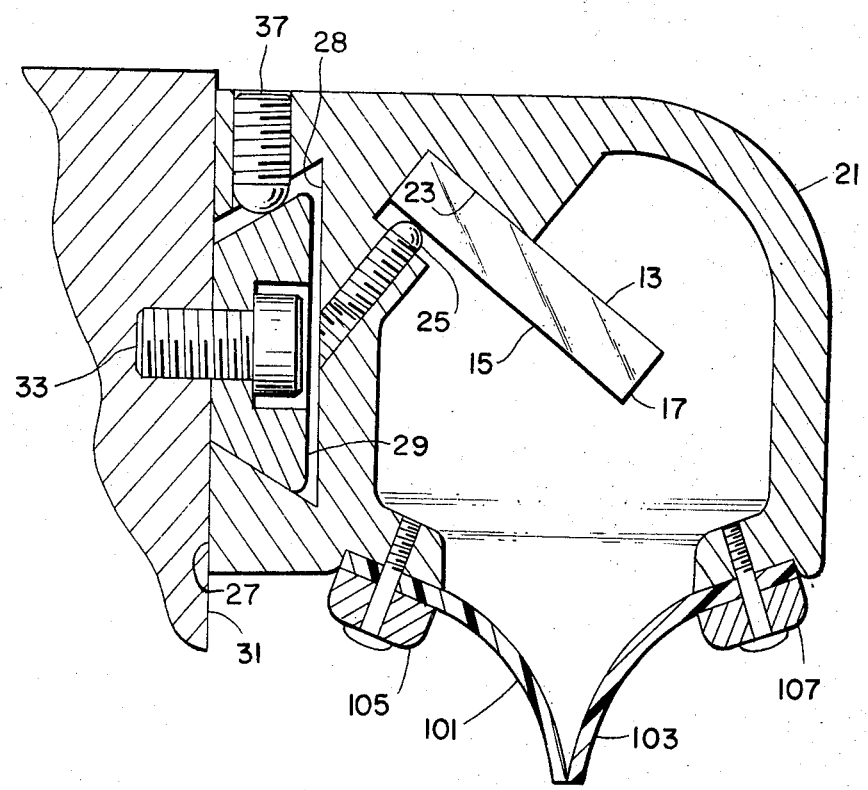
FIG. 2 is a sectional view of the apparatus taken along line 2—2 of FIG. 1.
Figure 6:
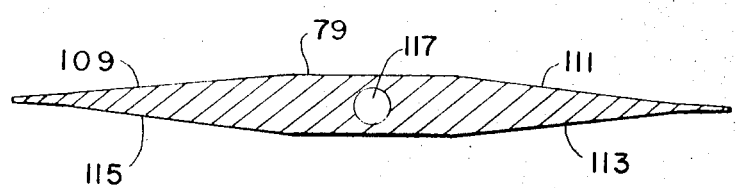
FIG. 6 is a sectional view of the transducer support housing taken along line 6—6 of FIG. 4.

As illustrated in FIGS. 2 and 3, a male dovetail 29 is provided to fasten spar 21 to machine mounting surface 31. Dovetail 29 is first secured to mounting surface 31 by fasteners, such as screws 33 and 35. Female dovetail 28 is then slid over male dovetail 29 and bolted down with a plurality of set screws, such as set screws 37 and 39. These screws tend to draw surface 27 tightly against mounting surface 31. If spar 21 has to be dismounted at a later time for servicing male dovetail part 29 remains on mounting surface thereby permitting expeditious remounting of spar 21.

Transducer head 41 consists of a main carriage body 43 and a carriage top 45. Both of these elements are made of low friction plastic material and are secured to each other by fasteners (not shown) such that scale engaging surfaces 47 and 49 are angled to each other at the same angle that surface 15 is angled with respect to edge 17. Since in the preferred embodiment surface 15 is perpendicular to edge 17, scale engaging surfaces 47 and 49 will also be perpendicular to each other.

Main carriage body 43 is provided with a rectangular opening 51 having a pair of opposed supporting surfaces 53 and 55. Received within opening 51 and in abutting relationship with supporting surfaces 53 and 55 is index grating 57. Index grating 57 is also made of silvering quality plate glass and has on surface 59 the same line frequency as scale 13. Since surfaces 53 and 55 are parallel to scale engaging surface 49 index grating surface 59 is also parallel to surface 49. As is evident from inspection of FIG. 3 surface 59 is spaced from surface 49.

Main carriage body 43 is also provided with a post 61 and a board 65 of insulating material which supports four photo-electric sensors 67. As is evident from inspection of FIG. 5 post 61 has a slotted recess 63.

Figure 4:
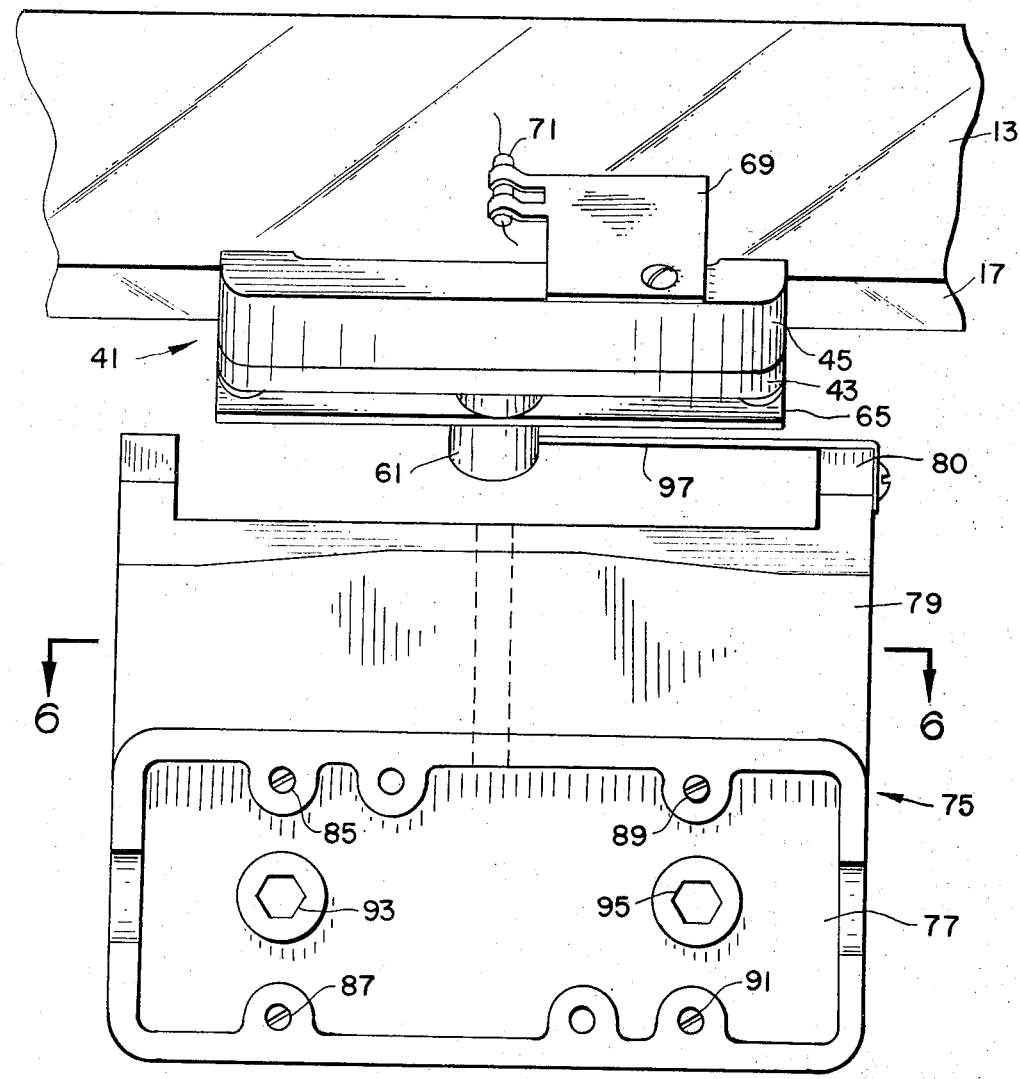
FIG. 4 is a sectional view taken along line 4—4 of FIG. 3 with the spar and seal removed for purposes of clarity.

Carriage top 45 supports lamp holder 69 which, in turn, supports lamp 71 in the manner illustrated in FIGS. 3 and 4.

Transducer support housing 75 includes a base portion 77 and upstanding protrusion portion 79. Housing 75 is secured to a second machine mounting surface 81 which is movable relative to machine mounting surface 31. In order to facilitate the mounting of housing 75 a temporary alignment bracket 83 is secured to both spar 21 and base portion 77. This arrangement correctly positions housing 75 relative to spar 21 and, hence, scale 31. Jack screws 85, 87, 89 and 91 in base portion 77 provide for correct spacing between base portion 77 and surface 81 and for mounting against irregular surfaces such as a cast machine surface. After these screws are brought into engagement with surface 81 base portion 77 is secured to surface 81 via bolts 93 and 95. Bracket 83 is then removed. However, if it becomes necessary to dismount housing 75 alignment bracket 83 can conveniently be used for remounting.

Figure 5:
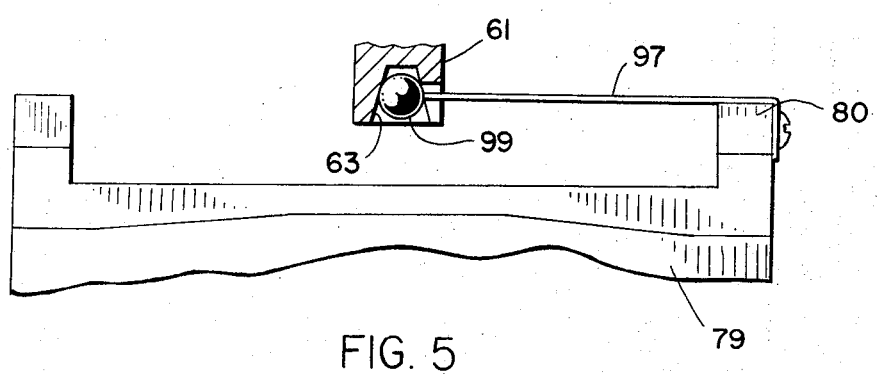
FIG. 5 is a detail of the connection between the transducer head and the transducer support housing.

As is also evident from inspection of FIG. 3 when housing 75 is properly mounted relative to both spar 21 and machine mounting surface 81 upstanding protrusion portion 79 extends into the interior of spar 21. To connect housing 75 to transducer head 41 a cantilever wire spring 97 is provided. As is best seen in FIGS. 4 and 5 cantilever spring 97 is secured at one of its ends to the enlarged upper end 80 of protrusion portion 79. The opposite end of cantilever spring 97 carries a ball 99 which is received in recess 63 provided in main carriage body 43. When spring 97 is assembled to end 80 and connected to main carriage body 43 transducer head 41 is connected to housing 75 by means of a ball and socket joint at the end of cantilever spring 97. The fact that scale 13 is inclined with respect to the vertical enables the upward force of cantilever spring 97 to hold scale engaging surfaces 47 and 49 in engagement with surface 15 and edge 17 in the manner illustrated in FIG. 3. This connection arrangement permits the necessary degree of freedom for transducer 41 so that it can remain in intimate contact with scale 13 even though the vertical position of housing 75 with respect to scale 13 may vary. At the same time, it virtually eliminates movement between housing 75 and transducer 41 along the length being travelled which would result in an erroneous reading of the actual relative distance travelled between machine mounting surfaces 31 and 81. With a spring pressure of approximately 5 ounces, backlash is in the order of 0.001 inches.

In order to prevent dirt, machine chips or coolant fluids from contaminating scale 13 or transducer 41, spar 21 is provided with a pair of lip seals 101 and 103 secured by means of a pair of seal retainers 105 and 107. These seals, together with enlarged upper end 80 tend to prevent transducer support housing 75 from being easily withdrawn from spar 21. The opposite ends of spar 21 are closed by plates, one being illustrated in FIG. 1 at 109.

In order to minimize the opening in seals 101 and 103 created by housing 75, the center section of protruding portion 79 is provided with tapered surfaces 109, 111, 113 and 115 to give it the approximate cross section of a canoe.

Protruding portion 79 is also provided with a through hole 117 which receives fine wires (not shown) from photo-electric sensors 67 and lamp 71. Thus base 77 may serve as a splice box to connect these wires with the relatively heavier cable which is connected to an electronic digital display counter (not shown). A cover (not shown) is bolted onto base 77 upon removal of temporary alignment bracket 83 to enclose the wire connections.

In operation, with lamp 71 energized any movement of the moire fringe pattern created by the integrated image effects of the line structures on both scale 13 and index grating 57 is sensed by photo-electric sensors 67 and converted into electrical signals. The change in intensity of the light on photo-electric sensors indicates the passage of each fringe and hence measures the relative travel of index grating 57 with respect to scale 13. The output from the cells may be amplified, shaped and summed by appropriate circuitry (not shown) provided on either insulating board 65 or in the electric digital display unit itself or both. Such circuitry forms no part of the present invention and those skilled in the art would appreciate that it could take several different forms. Since index grating 57 is secured relative to main carriage body 43 of transducer head 41 and since scale engaging surfaces 47 and 49 are continuously maintained in contact with surface 15 and edge 17 by means of cantilever spring 97 the distance and alignment between index grating 57 and scale 13 is maintained constant thereby assuring that transducer head 41 will always pick up an optical image off scale 13.

Whereas the drawings and accompanying description have shown and described a preferred embodiment of the present invention it should be apparent to those skilled in the art that various changes may be made in the form of the invention without effecting the scope thereof.

What we claim is:

1. Apparatus for measuring displacement between first and second relatively movable members, said apparatus comprising:
   a. a scale securable to said first member, said scale including first and second adjacent surfaces, said first scale surface being angled with respect to said second scale surface, one of said first and second scale surfaces having a given line frequency;
   b. transducer means including a carriage and an index grating, said carriage including first and second adjacent scale engaging surfaces, said first scale engaging surface being angled with respect to said second scale engaging surface at substantially the same angle that said first scale surface is angled with respect to said second scale surface, said index grating being held by said carriage parallel to and spaced from said one of said first and second scale engaging surfaces;
   c. support means securable to said second member; and
   d. means for continuously maintaining said first scale engaging surface in engagement with said first scale surface and said second scale engaging surface in engagement with said second scale surface, said means for continuously maintaining being secured to one of said transducer means and said support means, said means for continuously maintaining being connected to the other of said transducer means and said support means by means which permit at least limited rotational movement in every direction, said means for continuously maintaining being rigid in a direction parallel to the direction of relative movement between said first and second members and flexible in directions transverse to said direction of movement, whereby in operation when said first member moves relative to said second member the relative spacing and alignment between said index grating and said one of said first and second scale surfaces remains substantially constant.

2. The apparatus as set forth in claim 1 further including spar means, said spar means holding said scale and having a mounting surface engageable with said first member.

3. The apparatus as set forth in claim 2 further including a dovetail mounting means for mounting on said first member, said spar being provided with a mating dovetail mounting means whereby said mounting surface may be held in engagement with said first member.

4. The apparatus as set forth in claim 2 wherein said spar is provided with a longitudinally extending slot which is inclined with respect to said mounting surface, said scale being received in said slot.

5. The apparatus as set forth in claim 1 wherein said means for continuously maintaining is a spring.

6. The apparatus as set forth in claim 5 wherein said carriage is provided with a socket, and said spring is secured at one of its ends to said support means and carries a ball on its opposite end which is received in said socket.

7. The apparatus as set forth in claim 6 wherein said carriage includes light means and photoelectric sensing means.

8. Apparatus for measuring displacement between first and second relatively movable members, said apparatus comprising:
   a. a scale, said scale including first and second adjacent surfaces, said first scale surface being angled with respect to said second scale surface, one of said first and second scale surfaces having a given line frequency;
   b. means for securing said scale to said first member;
   c. transducer means including a carriage and an index grating, said carriage including first and second scale engaging means, said first scale engaging means adapted to engage said first scale surface, said second scale engaging means adapted to engage said second scale surface, said index grating being held by said carriage such that said index grating is parallel to said one of said first and second scale surfaces when said first scale engaging means is in engagement with said first scale surface and said second scale engaging means is in engagement with said second scale surface;

d. support means securable to said second member; and e. force applying means, said force applying means acting on said carriage means to simultaneously hold said first scale engaging means in engagement with said first scale surface and said second scale engaging means in engagement with said second scale surface, said force applying means maintaining the spacing between said carriage and said support means in the direction parallel to the direction of relative movement of said first and second members constant, said force applying means being secured to one of said carriage and said support means, said force applying means being connected to the other of said carriage and said support means by means which permit at least limited rotational movement in every direction, whereby in operation when said first member moves relative to said second member the relative spacing and alignment between said index grating and said scale remains substantially constant.

9. The apparatus as set forth in claim 8 wherein said first and second scale engaging means are surfaces which are adjacent to each other and angled with respect to each other at the same angle that said first scale surface is angled with respect to said second surface.

10. The apparatus as set forth in claim 9 wherein said force applying means is a cantilever spring.

11. The apparatus as set forth in claim 10 wherein said spring is provided with a ball on one of its ends and is secured at its opposite end to said one of said carriage and said support means, and wherein said other of said carriage and said support means is provided with a socket for receiving said ball to form a ball and socket type connection.

12. A transducer head for riding on a scale, said scale having first and second adjacent surfaces, said first scale surface being angled with respect to said second scale surface, said head comprising:

a. carriage means, said carriage including first and second adjacent scale engaging surfaces, said first scale engaging surface being angled with respect to said second scale engaging surface at substantially the same angle that said first scale surface is angled with respect to said second scale surface, one of said first and second scale engaging surfaces being provided with an opening;

b. an index grating, said grating being supported in said opening parallel to and spaced from said one of said first and second scale engaging surfaces;

c. photoelectric sensor means, said sensor means supported on said carriage in spaced relation to said grating on one side thereof; and d. light means, said light means supported on said carriage in spaced relation to said grating and on the opposite side thereof such that said grating and said one of said first and second scale engaging surfaces lie between said light means and said sensor means.

13. Apparatus for measuring displacement between first and second relatively movable members, said apparatus comprising:

a. a spar, said spar comprising an elongated channel having a generally U-shaped cross-section, the external surface of said channel including a mounting surface, said mounting surface being provided with a dovetail extending the length of said channel, said dovetail being designed to receive a mating dovetail provided on said first member to thereby secure said mounting surface to said first member, the interior of said channel being provided with a longitudinally extending slot, said slot being inclined with respect to the plane of said mounting surface;

b. a scale, said scale secured in said slot;

c. transducer means including a carriage and an index grating supported on said carriage; and d. means secured between said second member and said carriage for coupling said carriage to said second member whereby, when said first member moves relative to said second member, said carriage moves relative to said scale.

* * * * *

UNITED STATES PATENT OFFICE
CERTIFICATE OF CORRECTION

Patent No. 3,833,303    Dated September 3, 1974

Inventor(s) Richard H. Burns, Donald R. Hosack & Helmut Welker

It is certified that error appears in the above-identified patent and that said Letters Patent are hereby corrected as shown below:

Col. 5, line 2, change "0.001" to ---.0001---.

Signed and sealed this 17th day of December 1974.

(SEAL)
Attest:

McCOY M. GIBSON JR.                C. MARSHALL DANN
Attesting Officer                   Commissioner of Patents